United States Patent [19]

Grutsch

[11] 4,104,163

[45] Aug. 1, 1978

[54] REGENERATION OF FIXED BED FILTERS

[75] Inventor: James F. Grutsch, Hammond, Ind.

[73] Assignee: Standard Oil Company a corporation of Indiana, Chicago, Ill.

[21] Appl. No.: 771,432

[22] Filed: Feb. 24, 1977

Related U.S. Application Data

[63] Continuation-in-part of Ser. No. 699,696, Jun. 25, 1976, abandoned.

[51] Int. Cl.² ............................................. B01D 23/24
[52] U.S. Cl. ......................................... 210/80; 210/82
[58] Field of Search ............ 210/80, 82, 59, 275–279, 210/81, 40, DIG. 26, 35, 32; 134/6, 7, 40

[56] References Cited

U.S. PATENT DOCUMENTS

| | | | |
|---|---|---|---|
| 2,367,384 | 1/1945 | Tymstra et al. | 210/DIG. 26 |
| 2,956,682 | 10/1960 | Stephan | 210/82 |
| 3,574,329 | 4/1971 | Beavon | 210/80 |
| 3,803,031 | 4/1974 | Keller, Jr. | 210/80 |
| 3,867,285 | 2/1975 | Keller, Jr. | 210/40 |

*Primary Examiner*—Charles N. Hart
*Assistant Examiner*—Benoit Castel
*Attorney, Agent, or Firm*—Thomas J. Connelly; Arthur G. Gilkes; William T. McClain

[57] ABSTRACT

This application is directed to the regeneration of fixed bed granular media filters used for the clarification of liquids, after said filters have become unsuitable or inefficient due to the occlusion of oily substances. One such regeneration method comprises the steps of: backwashing the filter, draining the filter, contacting the filter with an aqueous alkali solution composed of sodium hydroxide dissolved in demineralized water, said solution having a pH value of about 10.5 or greater, at a temperature ranging from about ambient to about 200° F, for a time sufficient to regenerate the filter, and backwashing the filter. Generally, the alkali solution comprises about 0.1 to about 50 weight percent aqueous sodium hydroxide and the contacting is conducted for a period of about 0.1 to about 10 hours.

5 Claims, No Drawings

REGENERATION OF FIXED BED FILTERS

CROSS-REFERENCE TO RELATED APPLICATION

This application is a continuation-in-part of patent application Ser. No. 699,696 filed June 25, 1976, now abandoned.

BACKGROUND OF THE INVENTION

This invention relates to filtration and fixed bed filters, especially granular media filters, for the removal of suspended matter. More specifically it relates to the regeneration of fixed bed filters used to remove suspended or colloidal matter.

Granular media filtration may be defined as clarification of a suspension of dispersed material by passage through a porous bed of granular media that separates, and retains within the media, the solids constituting the suspension. Suspended and colloidal matter in various liquids are undesirable in many situations. For example, when unclarified surface water is used as make-up to cooling towers the water engineer must cope with varying amounts of organic matter, sand, silt, and turbidity entering the cooling system. Not only does this suspended matter foul the heat exchangers, it also complicates the problem of protecting the system against corrosion. While the obvious solution is to clarify the make-up, the installation and operation of clarification units for cooling tower make-up is often difficult to justify economically. The growing trend, therefore, is toward the use of sidestream filtration as a means of removing suspended matter from the circulating water.

Sidestream filtration generally involves shunting a small portion of the circulating water, usually about 2%, through filters and then back to the system. The granular filter media used may be sand, sand and gravel, or anthrafilt or others, and flocculating agents may be added as an aid to filtration. Commonly little attempt is made to remove 100% of the foreign matter--the aim is simply to reduce fouling in heat exchangers and running lines, reduce the amount of blowdown required to maintain the tolerable level of solids in the water, and decrease downtime in the process units.

Filtration, especially by granular media filters, is also extremely important in the treatment of waste water, whether municipal or industrial. Modern day multi-stage waste water treating processes recognize the importance of filtration at various stages of the water treatment scheme. Not only is filtration recognized as a final treatment to ensure high quality effluent, but filtration at other points of the treating sequence can lead to added benefits. For example, granular media filtration to reduce oil and solids prior to biological treatment can lead to improved efficiency of the biological treatment process. Also, in other types of waste water treatment, especially where an elaborate multi-stage process is not used, filtration may be extremely important.

As used in water treatment, a filter may consist of a bed of granular nonporous material held in place by the force of gravity. The most widely used units are rapid-sand or combinations of sand and coal filters in which gravity holds the material in place, and in which the flow is vertically downward. The filter medium is usually supported on a gravel bed which is underlain by an underdrain system that collects the water into a pipe which conveys it to a filtered water chamber. In one common type of granular media filter system, screened gravel is installed in a series of layers several inches thick ranging from coarser stones at the bottom to 0.1-inch or smaller particles at the top.

The normal operation of granular filters involves downward flow through the media until pressure drop due to clogging, or breakthrough of suspended matter, increases to a predetermined limit. The filter is then cleaned by reversed flow fluidization after pretreatment by air scrubbing or a hydraulic surface wash. Commonly used filter media are sand, such as rough or rounded silica sand, silica gravel, garnet sand, crushed or alluvial anthracite, and polymeric materials such as particles of polystyrene, polyethylene and the like. Often, several materials are used in layers in a single filter, sometimes called a mixed media filter. In some cases, fibrous materials can be used.

Filter beds utilize the coarse material comprising the bottom gravel layer to absorb the energy of the high velocity jets emerging from the underdrain system during a backwash operation. Once the backwashing streams emerge through the gravel layer their flow is slowed down enough to allow them to spread uniformly under the entire sand bed but still retain enough velocity to fluidize the finer granular filter media. This is important since these types of filters are periodically cleaned with filter water by reversal of flow and discharge of the sediment-laden water to a drain. Most rapid-sand filters are contained in concrete boxes and designed so that the upward flow of washwater, with auxiliary scouring systems, lifts the removed sediment out of the expanded filter medium and flushes it away to a point of disposal.

Granular media filters are frequently referred to as gravity or pressure filters. Since granular media filters are only a small part of the spectrum in filtration art, the meaning associated with these descriptions may be at variance with other filter technology. In the simplest terms, a gravity filter is a downflow design in which the water standing above the filter media is under atmospheric pressure. A gravity unit may be operated as a constant or declining rate unit; i.e., as the filter media clogs and the pressure drop increases, the rate may be maintained by increasing the head of water above the media, or allowed to decrease by maintaining a constant head. The pressure drop across a freshly regenerated unit is about 1 foot of water and the pressure drop at the end of the filter cycle may be as little as 5 feetor as much as 10-12 feet of water. A pressure filter of the granular media type is simply the same system in an enclosed vessel; i.e., the operating pressure drops across the media are about the same. In contrast, pressure filters in filtration systems other than the granular media type may have pressure drops orders of magnitude higher. Within the framework of these descriptions it is obvious that a variety of engineering and hydraulic designs are possible.

As time on stream progresses, these granular media filters lose effectiveness. The filter media becomes contaminated with various organic and inorganic substances to the point where it will no longer operate properly. Often, simple backwashing of the filter is sufficient to at least partially restore filter efficiency. Backwashing is conducted by reversing the flow of liquid through the filter bed. From time to time, simple backwashing does not restore filter efficiency to an acceptable level. This is especially true when the filter is deactivated due to the occlusion of oily substances.

It is an object of this invention to provide a method for regenerating a fixed bed granular media filter, especially when said filter has reduced efficiency due to the occlusion of oily substances.

SUMMARY OF THE INVENTION

This invention provides a method for the regeneration of fixed bed granular media filters for clarification of liquids, said filters having reduced efficiency due to the occlusion of oily substances, said regeneration comprising backwashing the filter, draining the filter, contacting the filter with an alkali solution dissolved in demineralized water, said solution having a pH value of about 10.5 or greater, at a temperature ranging from about ambient to about 200° F, for a time sufficient to regenerate the filter, and backwashing the filter. Generally, the alkali solution comprises about 0.1 to about 50 weight percent aqueous sodium hydroxide and the contacting is conducted for a period of about 0.1 to about 10 hours. Preferably, the solution is comprised of about 0.5 to about 10 weight percent aqueous sodium hydroxide and the preferable contacting period is about 0.5 to about 3 hours. This period of time is usually sufficient to regenerate or partially restore filter effectiveness without causing undue downtime for the filtration process.

Commonly, the filter is backwashed prior to contacting the bed with the aqueous alkali solution. This is done for a variety of reasons, such as: one, it allows a determination of whether a simple back wash will restore filter efficiency; and two, it removes some solid matter and/or agglomerate which aid in regenerating the filter. Another procedure is to drain the filter before contacting it with the aqueous alkali solution in order to ensure that the solution is not diluted with either the dirty water or the back wash water. Applicant's method calls for the dilution of the alkali in the demineralized water before the solution is exposed to the filter bed. It appears feasible from a practical and economic standpoint to dissolve the alkali beforehand although the qualitative effect is no different should the alkali be added after the water is in contact with the filter.

Suitable alkali for use in this regeneration process comprises any strong alkali compatible with the materials present and with the environment in general. The alkali should not unduly attack the filter, nor should it create problems in up or downstream processing if it is not removed, nor should it create disposal problems. One commonly used alkali because of its low cost, availability and compatability with these types of systems is sodium hydroxide. Other suitable alkali are KOH, $Na_3PO_4$ and lime. It should be noted that the higher the concentration of alkali in solution, the faster the regeneration process will occur. However, extremely high concentrations are viscous and can cause problems.

The present invention is directed to the regeneration of a filter exhibiting the occlusion of oily substances. Although in some cases oils and fats are chemically similar, they sometimes exhibit different chemical and physical properties. Because of these different properties, there are different ways in which each can be removed from a filter. Many of the systems used today employ the use of coalescing tactics in which a chemical reaction is propagated in order to form entirely new water soluble products which can be washed away. One such method used to cleanse a filter of fatty substances is the conventional saponification reaction--the reaction of fats with alkali to make soaps and glycerol, both of which are water soluble. Applicant's process differs from this type of a reaction in that Applicant utilizes a negative electrical charge as the physicochemical device to disperse the oily substances. In most cases, it is Applicant's intended goal to cleanse the filter not by chemically reacting alkali with the oil to produce new and different water soluble substances but instead to use sodium hydroxide dissolved in demineralized water to maximize the coulombic surface electrical charge on the debris. Commonly, little or no chemical reaction occurs, for the alkali remains unchanged throughout the process. One might speculate that the negative electrical surface charge on each oily particle, which is clinging to the different layers of the filter bed; i.e., sand, gravel, anthracite, etc., is increased thereby causing the oily particles to repel one another. In each individual particle quest to repel like electrical charges, they bump together and thereby free themselves from the filter and become suspended in the solution. In this state, the filter is susceptible to being backwashed in the conventional manner in order to carry away the oily substances and the media regains its original filtering properties.

Almost everything in nature has a negative electrical surface charge and if this charge is increased sufficiently the negative charges on like particles will repel one another. In the fixed bed granular media filters, the sticking force of the oily substances adhering to the sand or gravel is considerably greater than the existing surface charges. In order to increase the surface charge something has to be introduced to the filter. Maximizing filtration efficiency requires that these coulombic repulsive forces be controlled by controlling the physicochemical properties of the dispersed solids. Utilizing this knowledge in conjunction with the zeta potential or electrophoretic mobility phenomena, which teaches that the more alkaline the solution the greater the electrical charge, it is possible to increase the charge on a particle. Thus, increasing alkalinity increases the repelling electrical surface charge. In addition, it is known that the more ion-free the water phase is, the greater the surface electrical charge because double layer repression does not reduce this charge. For these reasons, applicant uses a relatively ion-free water phase, demineralized water instead of fresh water, in order to minimize the number of free ions. This relatively ion-free water phase together with the high alkalinity of the solution will allow the oily substances to repel the negative surface charges on the filter and become separated. By this process the filter is regenerated.

Preferably, the filter is backwashed to remove the dirty water, solids and the like which are presently in contact with the filter. The filter is then drained and contacted with an aqueous solution comprised of an alkali dissolved in demineralized water, said solution having a pH value of about 10.5 or greater. This high pH value is important to maintain the required alkalinity of the solution to ensure that the negative electrical surface charge is sufficient to cause the particles to repel one another. The temperature range of this should be from about ambient to about 200° F so that the regeneration process can proceed at a reasonable rate. It is important that the temperature doesn't become excessive for this could lead to the destruction of some of the materials which are present. It would also appear to be a waste of energy to heat the aqueous alkali solution or filter bed unnecessarily and it would be impractical to heat the demineralized water above its boiling point. If additional heat is ever needed, it could conveniently be provided by injecting steam onto the filter. The solution should remain in contact with the filter for a period of about 0.1 to about 10 hours to ensure that the oily substances have sufficient time to become suspended in the solution. The filter is now ready to be backwashed to remove the contaminants. The solids and/or agglomerates which are backwashed out of the filter can be disposed by processing this material in a biological treatment facility, incinerated, used for landfill or disposed of in some other manner.

Sometimes it is desirable to contact the filter bed with an organic solvent prior to contacting with alkali. This is especially true when the filter has been accidentally contaminated with gross quantities of oil-soluble material such as asphalt-like oily matter. Suitable organic solvents are light hydrocarbons such as naphthas or distillates boiling in the range from about 300° F to about 750° F. Various other solvents, such as chlorinated materials, may also offer advantages. A convenient time to contact the filter bed with said solvent is after backwashing but prior to draining before treatment with the alkali solution.

One preferred scheme for the regeneration of fixed bed filters for the clarification of liquids wherein the filters have reduced efficiency due to the occlusion of oily substances comprises; first, backwashing the filter; second, draining the filter; third, contacting the filter with an aqueous alkali solution comprised of sodium hydroxide dissolved in demineralized water, said solution having a pH value of about 10.5 or greater, at a temperature ranging from about ambient to about 200° F, for a time sufficient to regenerate the filter; and fourth, backwashing the filter.

I claim:

1. A method for the regeneration of a fixed bed granular media filter used for the clarification of liquids, after said filter has become unsuitable or inefficient due to the occlusion of oily substances, said regeneration comprising:
    first, backwashing the filter;
    second, draining the filter;
    third, contacting the filter with an aqueous alkali solution comprised of sodium hydroxide dissolved in demineralized water, said solution having a pH value of about 10.5 or greater, at a temperature ranging from about ambient to about 200° F, for a time sufficient to regenerate the filter; fourth, backwashing the filter.

2. The method as described in claim 1 wherein the aqueous alkali solution is comprised of about 0.1 to about 50 weight percent aqueous sodium hydroxide dissolved in demineralized water and wherein said contacting is conducted for a period of about 0.1 to about 10 hours.

3. The method as described in claim 2 wherein the aqueous alkali solution is comprised of about 0.5 to about 10 weight percent aqueous sodium hydroxide dissolved in demineralized water, and said contacting is conducted at a temperature from about 100° F to about 120° F for a period of about 0.5 to about 3 hours.

4. The method as described in claim 1 wherein the fixed bed granular media filter is contacted with an organic solvent prior to contacting with the aqueous alkali solution.

5. The method as described in claim 4 wherein the organic solvent comprises a light hydrocarbon stream boiling in the range from about 300° F to about 750° F.

* * * * *